Patented May 3, 1932

1,856,792

UNITED STATES PATENT OFFICE

HORACE A. SHONLE, OF INDIANAPOLIS, INDIANA, ASSIGNOR TO ELI LILLY AND COMPANY, OF INDIANAPOLIS, INDIANA, A CORPORATION OF INDIANA

ANHYDROUS-ALKALI-METAL SALTS OF 5,5-DI-ALIPHATIC-SUBSTITUTED BARBITURIC ACIDS AND PROCESSES OF PRODUCING THEM

No Drawing.   Application filed June 22, 1929. Serial No. 373,051.

It is the object of my invention to produce water-soluble alkali-metal salts of 5,5-di-aliphatic-substituted barbituric acids which:
1. Will be stable, without liability to deterioration on standing;
2. When dissolved, will have an alkalinity which is
   (a) Not too high for hypodermic administration (and more especially for intravenous injection); and yet
   (b) Sufficiently high that any tendency to produce a precipitate is minimized;
3. Will produce a clear solution in water when dissolved; and
4. Will quickly and completely dissolve in water.

It is found that aqueous solutions of the alkali-metal salts of many if not all 5,5-di-aliphatic-substituted barbituric acids slowly decompose, presumably on account of the alkalinity resulting from the hydrolysis of the salt of a strong base and a weak acid. These solutions show varying degrees of stability; for instance, sodium di-ethyl barbiturate in water solution breaks down more slowly than does sodium iso-amyl ethyl barbiturate.

Moreover, not only do such salts decompose when in aqueous solution, but it is found that many of them also decompose while in the ordinary solid state—by which I mean the solid state as the salts are ordinarily prepared by evaporation from aqueous solution—even when protected in sealed glass ampoules. The degree of stability of the salts in the ordinary solid state likewise varies, some being substantially stable while others are very unstable. For instance, sodium di-ethyl barbiturate is less unstable than is sodium iso-amyl ethyl barbiturate or sodium iso-butyl ethyl barbiturate or sodium cyclohexenyl ethyl barbiturate.

In addition, if an attempt be made to drive off this remaining water from the salts as ordinarily prepared in solid form, by further evaporation, it is found that this also produces a decomposition or deterioration of many of these salts.

It has been found that water solutions of certain of the alkali-metal salts of these barbituric acids, when administered hypodermically and more especially when administered intravenously, are very efficient as anæsthetics. However, it seems that those alkali-metal salts of such barbituric acids which are the more desirable for hypodermic use in the production of anæsthesia are the ones which have the greater tendency toward decomposition both when in the ordinary solid state and when in water solution. When such deterioration or decomposition occurs, the anæsthetic effect is markedly reduced; and in addition, and partially in consequence, the production of a definite degree of anæsthesia is attended by an increase in certain undesirable side reactions, such as difficulty in respiration. It is found that upon such decomposition a water-insoluble substance is formed, which appears as a precipitate if the salt is in solution and as an undissolved portion upon attempting to form a water solution if the salt is in solid form, such decomposition or deterioration in its initial stages appearing only as a cloudiness in the solution. The loss in anæsthetic effect, however, is found to be in much greater ratio than the amount of such insoluble substance so formed. This lack of stability, with its variation in anæsthetic effect, is of course most undesirable; since it makes impossible a predetermination of the anæsthesia which will be produced by a given dose.

I have found that this decomposition occurs only in the presence of water. This water may be that of the water solution; or it may be that which is present in some form in the salts in the solid state in which they are obtained by usual methods of preparation. So far as I know, none of those alkali-metal salts of these barbituric acids that are included in the scope of this present application have ever before been prepared in a substantially anhydrous condition — by which term "substantially anhydrous condition" I mean containing less than one per cent (1%) and desirably less than one-half of one per cent (½%) of water. I have so prepared them; and have found that such anhydrous salts are substantially stable, even when the corresponding hydrated salts are far from stable when kept under the same conditions.

This present application is confined to the anhydrous alkali-metal salts of certain 5,5-di-aliphatic-substituted barbituric acids, and the processes of making them. These barbituric acids may be represented by the following general formula:

(1) 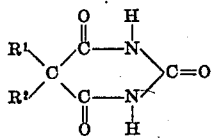

The alkali-metal salts of these barbituric acids may be represented by the following general formula:

(2) 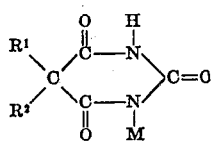

wherein "M" represents an alkali metal, preferably sodium.

In these formulas, and according to my invention:

The substituent group $R^1$ is an aliphatic group containing five (5) hydrogen atoms and having no triple-bonded carbon atoms—such for instance as the ethyl group, which is a saturated group, or the allyl group, which is an unsaturated group. In my more specific claims, the substituent aliphatic group $R^1$ is limited to the ethyl group.

The substituent group $R^2$ is also an aliphatic group. It may be either the same as or different from the substituent group $R^1$, but is different therefrom in the preferred forms of my invention. It may be either a saturated or an unsaturated straight-chain group, branched-chain group, or cyclic group, of the aliphatic series, having no triple-bonded carbon atoms, and containing not less than two (2) nor more than eight (8) carbon atoms, and desirably containing not less than four (4) nor more than six (6) carbon atoms, and most desirably containing five (5) carbon atoms. For instance, if this second substituent aliphatic group, $R^2$, contains five (5) carbon atoms, it may be either the n-amyl group, the iso-amyl group, any of the secondary amyl groups, a pentenyl group, the cyclo-pentyl group, or a cyclo-pentenyl group. Similar isomeric variations may be used, of course, when the substituent group $R^2$ contains a larger or smaller number of carbon atoms than five (5).

In the foregoing description, and in this application generally, I use the term "aliphatic" in its broader sense of including all hydrocarbon groups other than those based on the benzene ring; but my present invention is limited to those cases where $R^1$ and $R^2$, in addition to other limitations which may be stated in particular claims, have no two carbon atoms bonded together by a triple bond.

As already stated, I prefer that $R^1$ and $R^2$ be different. This is because I have found most effective for anæsthetic use those alkali-metal salts, represented by formula (2), in which $R^1$ and $R^2$ are different, thus producing an unsymmetrical structure—as, for instance, when $R^1$ is the ethyl group, and $R^2$ is an aliphatic group containing five (5) carbon atoms.

The anæsthetic compounds used may be mixtures of two or more of these salts—as for example a mixture of the salts of two secondary-amyl-ethyl-barbituric acids—so that in my broader claims presented herein I do not intend to limit the compounds covered to chemical individuals, but intended to include mixtures of different ones of the generic class of compounds covered.

The compound which has so far been used clinically in the production of anæsthesia is that represented by formula (2) and in which $R^1$ is the ethyl group, $R^2$ is the iso-amyl group, and M is a sodium. Others of the same generic class of compounds, represented by formula (2), have been found to produce anæsthesia of different degrees for a given dose administered intravenously. Among these others, for example, are the soduim salts where $R^1$ is the ethyl group and $R^2$ is the secondary-butyl group, any of the secondary-amyl groups, or the cyclo-hexenyl group. These compounds just mentioned are all sodium salts where $R^1$ is the ethyl group; and they are all compounds which are found to be unstable to a greater or less degree when in water solution or when in hydrated solid state, which is the only form in which they and the other salts referred to have been prepared in the solid state by the processes heretofore used.

By my present process, however, I prepare all of these various compounds in anhydrous form; and in doing so get substances which are in accord with the objects of the invention which have already been stated. These anhydrous salts as prepared by my process are found to be very stable, for indefinite periods; but are usually hygroscopic, so that for maintaining their stability they must be kept sealed against moisture, as in glass ampoules.

In explaining the method of preparation of the anhydrous salts, I will use as an illustration the preparation of anhydrous sodium iso-amyl ethyl barbiturate.

In preparing this, one part of iso-amyl ethyl barbituric acid is suspended in enough absolute alcohol (the alcohol I have used is ethyl alcohol) to facilitate handling—in this instance, conveniently about four times its weight. To this is added a concentrated aqueous solution (50% concentration or higher) or an alcoholic solution of sodium hydroxide, preferably carbonate-free or substantially so, containing $$\frac{40}{226}$$

parts of sodium hydroxide; which is the amount of sodium hydroxide necessary to combine in equal molar proportions with the iso-amyl ethyl barbituric acid. In either case the solution in which the reaction occurs is practically a substantially alcoholic solution, for the amount of water used in making the concentrated aqueous solution of sodium hydroxide is such a small fraction of the total liquid used in the process that it is found to have no appreciable effect either in producing decomposition of the salt during the process of preparation or in causing water to remain to produce material hydration of the salt after the evaporation which is described below.

Instead of using the solution of sodium hydroxide, an alcoholic solution containing sufficient sodium ethylate to combine in equal molar proportions with the iso-amyl ethyl barbituric acid may be used; which has the advantage of freedom from water.

In either instance—that is, whether sodium hydroxide or sodium ethylate is used—there is a reaction which forms in the solution the sodium salt of iso-amyl ethyl barbituric acid.

The resultant alcoholic solution of sodium iso-amyl ethyl barbiturate is filtered clear; and is then evaporated under vacuum at a low temperature to remove the alcohol, and the water if any. If water is present, as from the use of an aqueous solution of sodium hydroxide, it is in such a small proportion that it is evaporated with the alcohol. In preparing large quantities, when the material has been evaporated to a thick sirup it is desirably spread out in thin layers to facilitate the further evaporation. The evaporation is continued until the salt remaining is substantially anhydrous, as above defined; and may even be continued until the water remaining is as little as 0.1% to 0.2%.

The salt in this substantially anhydrous solid form is then pulverized, and put up in sealed ampoules.

During these operations, care must be taken to keep the sodium iso-amyl ethyl barbiturate from being exposed to either moist air or $CO_2$.

The anhydrous sodium iso-amyl ethyl barbiturate thus obtained is a white substance readily soluble in water, producing a clear solution in concentrations as high as 20% or even higher, and is sufficiently rapidly soluble so that a 10% solution may be formed in less than half a minute. It is soluble in alcohol, and insoluble in ether. It is hygroscopic. It is readily decomposed by $CO_2$.

In addition, the salt thus obtained even after long standing, is found to produce a clear aqueous solution; and is thereby quite different from the salt obtained by evaporation after preparation in a water solution, as heretofore done, since that salt if concentrated to a substantially anhydrous condition contains the insoluble substance heretofore referred to and does not produce a clear aqueous solution, and if not so concentrated decomposes in the presence of its contained moisture and so unless used immediately will not produce a clear aqueous solution.

In a way similar to that above described for sodium iso-amyl ethyl barbiturate, by the addition of a solution of one molar proportion of the hydroxide or of the ethylate of an alkali metal, as of sodium, to a suspension or solution of one molar proportion of any of the other herein-contemplated 5,5-di-aliphatic-substituted barbituric acids in sufficient absolute alcohol to facilitate handling, the corresponding salt of such barbituric acid may be prepared in an anhydrous or substantially anhydrous condition. Such salts, for instance, have been prepared of a number of 5,5-di-aliphatic-substituted barbituric acids, including in addition to iso-amyl ethyl barbituric acid, the following:

1. Di-ethyl barbituric acid;
2. Di-allyl barbituric acid;
3. Iso-propyl ethyl barbituric acid;
4. Iso-propyl allyl barbituric acid;
5. Iso-propyl brom-propenyl barbituric acid;
6. n-butyl ethyl barbituric acid;
7. n-butyl allyl barbituric acid;
8. Secondary-butyl ethyl barbituric acid;
9. Secondary-butyl allyl barbituric acid;
10. n-amyl ethyl barbituric acid;
11. Cyclo-pentyl ethyl barbituric acid;
12. Any of the secondary-amyl ethyl barbituric acids, and mixtures thereof;
13. Cyclo-hexenyl ethyl barbituric acid;
14. n-heptyl ethyl barbituric acid;
15. A secondary-heptyl ethyl barbituric acid.

(I believe that the acids listed at Nos. 11 and 15, some of the acids listed under No. 12, and the salts of acids Nos. 8, 9, 11, 12, and 15, are wholly new. My copending applications Serial No. 387,084, filed August 19, 1929, and Serial No. 594,150, filed February 19, 1932, are directed to certain of these new substances. The n-amyl ethyl barbituric acid listed as No. 10 and its salts and certain intermediates, were described in my earlier-filed application which was also copending with the present application, and form the subject-matter of my Patent No. 1,813,867 which on July 7, 1931, was granted on that application.)

Before preparing the salts, it is usually desirable to recrystallize the acids from which the salts are made, to ensure their purity.

When these salts are obtained from sufficiently pure acids, they are readily and rapidly soluble in water, producing a clear solution. They are soluble in alcohol in varying degrees, such solubility increasing generally with increased molecular weight. They are insoluble in ether. They react with $CO_2$, so that when $CO_2$ is bubbled through aqueous solutions of them as concentrated as five per cent (5%) a precipitate of the corresponding barbituric acid appears. They are all bitter in taste. They are variably hygroscopic, those of higher molecular weight being markedly so. Their aqueous solutions are all alkaline in reaction.

When injected hypodermically in aqueous solution, these salts all exert hypnotic effects, in varying degrees. A most effective mode of producing anæsthesia by them is by intravenous injection. The salts of those of the above-described barbituric acids which have the higher molecular weights produce more satisfactory anæsthesia than do those of the barbituric acids of lower molecular weight. This variation in degrees of anæsthesia, however, is not directly proportional to the molecular weight. Solutions of sodium iso-amyl-ethyl barbiturate and of the sodium salts of those acids given in the above list as numbers 7 to 15 inclusive are found to produce very satisfactory anæsthesia when so injected.

On the basis of the preparation of these various salts, it is evident that the same procedure and the same general type of anhydrous alkali-metal salts can be obtained with all the various 5,5-di-aliphatic-substituted barbituric acids, of which those named are representative, in which $R^1$ and $R^2$ as above described are respectively the first and second substituent groups referred to. In the salts which have so far been made, the alkali metal used is sodium. However, it is obvious that anhydrous potassium salts and anhydrous lithium salts may be similarly prepared.

In the preparation of these various salts, equal molecular equivalents of the reacting compounds should be used. In each instance, if such equal molecular equivalents are used, an aqueous solution of the salt produced will have a definite alkalinity, slightly different for the different salts but definite for each salt. If the amounts of the reacting compounds used are not exact molecular equivalents, there will of course be a corresponding excess of either the base or the acid, tending to vary the alkalinity from that of the pure salt. If there is any excess of either the base (in which term I include the ethylate) or the acid, I prefer a slight excess of the acid so long as such excess is not sufficient to interfere with the clearness of the water solution; for such slight excess of the acid does no harm, while an excess of the base increases the ultimate alkalinity of the aqueous solution obtained, with some increase in the danger of injury to the veins on intravenous injection. My invention, however, includes in its scope such variations as these.

Any desired method may be used for obtaining substantial molecular equivalency of the sodium hydroxide or the sodium ethylate with the barbituric acid. In practice one convenient way to do this is to titrate the barbituric acid with the solution of the sodium hydroxide or the sodium ethylate, using either color indicators (thymol blue or cresol phthalein for example) or the electrometric method to determine on test samples the end point of the titration.

I claim as my invention:

1. A practically anhydrous alkali-metal salt of a 5,5-di-aliphatic-substituted barbituric acid, represented by the following formula:

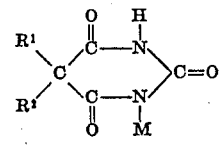

in which M is an alkali metal, $R^1$ is an aliphatic group containing five (5) hydrogen atoms, and $R^2$ is an aliphatic group containing not less than three (3) and not more than eight (8) carbon atoms, and $R^1$ and $R^2$ have no triple-bonded carbon atoms; which salt contains less than one percent (1%) of water and which dissolves in water to produce a clear solution.

2. A practically anhydrous alkali-metal salt of a 5,5-di-aliphatic-substituted barbituric acid as set forth in claim 1, and in which $R^1$ is the ethyl group.

3. A practically anhydrous alkali-metal salt of a 5,5-di-aliphatic-substituted barbituric acid as set forth in claim 1, and in which $R^2$ contains not less than four (4) and not more than six (6) carbon atoms.

4. A practically anhydrous alkali-metal salt of a 5,5-di-aliphatic-substituted barbituric acid as set forth in claim 1, and in which $R^2$ contains five (5) carbon atoms.

5. A practically anhydrous alkali-metal salt of a 5,5-di-aliphatic-substituted barbituric acid as set forth in claim 1, and in which $R^2$ is the iso-amyl group.

6. A practically anhydrous alkali-metal salt of a 5,5-di-aliphatic-substituted barbituric acid as set forth in claim 1, and in which $R^1$ is the ethyl group, and $R^2$ contains not less than four (4) and not more than six (6) carbon atoms.

7. A practically anhydrous alkali-metal salt of a 5,5-di-aliphatic-substituted barbituric acid as set forth in claim 1, and in which $R^1$ is the ethyl group, and $R^2$ contains five (5) carbon atoms.

8. A practically anhydrous alkali-metal salt of a 5,5-di-aliphatic-substituted barbituric acid as set forth in claim 1, and in which $R^1$ is the ethyl group, and $R^2$ is the iso-amyl group.

9. An alkali-metal salt of a 5,5-di-aliphatic-substituted barbituric acid, represented by the following formula:

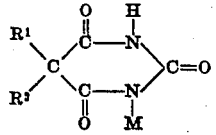

in which M is an alkali metal, $R^1$ is an aliphatic group containing five (5) hydrogen atoms, and $R^2$ is an aliphatic group containing not less than three (3) and not more than eight (8) carbon atoms, and $R^1$ and $R^2$ have no triple-bonded carbon atoms; which salt contains sufficiently little water so that it is substantially free from deterioration and which dissolves in water to produce a clear solution.

10. An alkali-metal salt of a 5,5-di-aliphatic-substituted barbituric acid as set forth in claim 9, and in which $R^1$ is the ethyl group.

11. An alkali-metal salt of a 5,5-di-aliphatic-substituted barbituric acid as set forth in claim 9, and in which $R^2$ contains not less than four (4) and not more than six (6) carbon atoms.

12. An alkali-metal salt of a 5,5-di-aliphatic-substituted barbituric acid as set forth in claim 9, and in which $R^2$ contains five (5) carbon atoms.

13. An alkali-metal salt of a 5,5-di-aliphatic-substituted barbituric acid as set forth in claim 9, and in which $R^2$ is the iso-amyl group.

14. An alkali-metal salt of a 5,5-di-aliphatic-substituted barbituric acid as set forth in claim 9, and in which $R^1$ is the ethyl group, and $R^2$ contains not less than four (4) and not more than six (6) carbon atoms.

15. An alkali-metal salt of a 5,5-di-aliphatic-substituted barbituric acid as set forth in claim 9, and in which $R^1$ is the ethyl group, and $R^2$ contains five (5) carbon atoms.

16. An alkali-metal salt of a 5,5-di-aliphatic-substituted barbituric acid as set forth in claim 9, and in which $R^1$ is the ethyl group, and $R^2$ is the iso-amyl group.

17. A practically anhydrous alkali-metal salt of a 5,5-di-aliphatic-substituted barbituric acid as set forth in claim 1, and in which $R^1$ and $R^2$ are different from each other.

18. An alkali-metal salt of a 5,5-di-aliphatic-substituted barbituric acid as set forth in claim 9, and in which $R^1$ and $R^2$ are different from each other.

19. A practically anhydrous alkali-metal salt of a 5,5-di-aliphatic-substituted barbituric acid as set forth in claim 1, and in which $R^2$ is a saturated aliphatic group.

20. An alkali-metal salt of a 5,5-di-aliphatic-substituted barbituric acid as set forth in claim 9, and in which $R^2$ is a saturated aliphatic group.

21. A practically anhydrous alkali-metal salt of a 5,5-di-aliphatic-substituted barbituric acid as set forth in claim 1, and in which the alkali metal is sodium.

22. A practically anhydrous alkali-metal salt of a 5,5-di-aliphatic-substituted barbituric acid as set forth in claim 1, and in which $R^1$ is the ethyl group, and $R^2$ contains not less than four (4) and not more than six (6) carbon atoms, and in which the alkali metal is sodium.

23. An alkali-metal salt of a 5,5-di-aliphatic-substituted barbituric acid as set forth in claim 9, and in which the alkali metal is sodium.

24. An alkali-metal salt of a 5,5-di-aliphatic-substituted barbituric acid as set forth in claim 9, and in which $R^1$ is the ethyl group, and $R^2$ contains not less than four (4) and not more than six (6) carbon atoms, and in which the alkali metal is sodium.

25. The method of preparing a salt of the composition represented by the following formula:

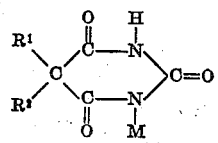

in which M is an alkali metal, $R^1$ is an aliphatic group containing five (5) hydrogen atoms, and $R^2$ is an aliphatic group containing not less than two (2) and not more than eight (8) carbon atoms, and $R^1$ and $R^2$ have no triple-bonded carbon atoms; comprising producing a reaction in a solution essentially alcoholic between the barbituric acid corresponding to said salt and a substantially carbonate-free reagent which is of the class consisting of hydroxides and alcoholates and which reacts with said acid and contains an alkali metal which replaces the hydrogen in said acid to form the desired salt, and evaporating to the desired dryness under vacuum at a low temperature.

26. The method of preparing a salt of the composition represented by the following formula:

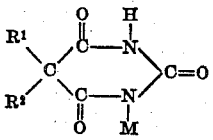

in which M is an alkali metal, $R^1$ is an aliphatic group containing five (5) hydrogen atoms, and $R^2$ is an aliphatic group containing not less than two (2) and not more than eight (8) carbon atoms, and $R^1$ and $R^2$ have no triple-bonded carbon atoms; comprising producing a reaction in a solution essentially alcoholic between the barbituric acid corresponding to said salt and a substantially carbonate-free reagent which is of the class consisting of hydroxides and alcoholates and which reacts with said acid and contains an alkali metal which replaces the hydrogen in said acid to form the desired salt, and evaporating under vacuum at a low temperature until the salt is in solid form and contains not to exceed one percent (1%) of water.

27. A practically anhydrous alkali-metal salt of a 5,5-di-aliphatic-substituted barbituric acid as set forth in claim 1, and in which $R^1$ is the ethyl group, $R^2$ is the iso-amyl group, and M is sodium.

28. An alkali-metal salt of a 5,5-di-aliphatic-substituted barbituric acid as set forth in claim 9, and in which $R^1$ is the ethyl group, $R^2$ is the iso-amyl group, and M is sodium.

In witness whereof, I have hereunto set my hand at Indianapolis, Indiana, this 20th day of June, A. D. one thousand nine hundred and twenty nine.

HORACE A. SHONLE.